(12) United States Patent
Schmidt (10) Patent No.: US 9,079,720 B1
(45) Date of Patent: Jul. 14, 2015

(54) ROLLER CHAIN LUBRICATOR

(75) Inventor: Thomas Donald Schmidt, South Coventry Township, PA (US)

(73) Assignee: Linear Market Technical Services Corporation, Pottstown, PA (US)

(*) Notice: Subject to any disclaimer, the term of this patent is extended or adjusted under 35 U.S.C. 154(b) by 1048 days.

(21) Appl. No.: 13/170,327

(22) Filed: Jun. 28, 2011

Related U.S. Application Data (60) Provisional application No. 61/360,937, filed on Jul. 2, 2010, provisional application No. 61/412,111, filed on Nov. 10, 2010.

(51) Int. Cl.
  *F16N 7/16* (2006.01)
  *B65G 45/08* (2006.01)
  *F16H 57/05* (2006.01)

(52) U.S. Cl.
  CPC .............. *B65G 45/08* (2013.01); *F16H 57/05* (2013.01)

(58) Field of Classification Search
  USPC ....................................................... 184/15.1
  See application file for complete search history.

(56) References Cited

U.S. PATENT DOCUMENTS

| | | | |
|---|---|---|---|
| 1,984,148 A * | 12/1934 | Morrish et al. ............... | 184/15.1 |
| 4,158,402 A | 6/1979 | Romans | |
| 4,578,120 A * | 3/1986 | Chiarella .......................... | 134/9 |
| 4,593,923 A * | 6/1986 | Thalmann ....................... | 280/261 |
| 4,648,486 A * | 3/1987 | Kayser et al. .................. | 184/15.1 |
| 4,783,186 A | 11/1988 | Manning et al. | |
| 4,877,111 A * | 10/1989 | Kilper .......................... | 184/15.1 |
| 4,891,037 A * | 1/1990 | Maples .......................... | 474/91 |
| 5,020,637 A | 6/1991 | Hoenselaar et al. | |
| 5,092,292 A | 3/1992 | Iguchi et al. | |
| 5,213,180 A | 5/1993 | Masonek et al. | |
| 5,269,614 A * | 12/1993 | Taylor ................................ | 401/9 |
| 5,458,101 A | 10/1995 | Crooks | |
| 6,257,369 B1 * | 7/2001 | Pesl ............................. | 184/15.1 |
| 6,755,295 B2 * | 6/2004 | Weskamp et al. ............. | 198/500 |
| 2005/0000752 A1 * | 1/2005 | Fleige .......................... | 184/15.1 |
| 2009/0223745 A1 | 9/2009 | Marcucci | |

\* cited by examiner

*Primary Examiner* — Michael Barr
*Assistant Examiner* — Benjamin L Osterhout
(74) *Attorney, Agent, or Firm* — Wendy W. Koba (57) ABSTRACT

An apparatus for lubricating or cleaning a drive chain during a maintenance operation is configured as an enclosure that is inserted over a mounted chain. The apparatus disperses lubricant/cleaning solvent to specific locations through channels formed within the enclosure. The channels are strategically located within the enclosure to ensure that the applied material is directed to specific locations along the chain. A conventional lubricant/solvent is introduced through one or more inlet ports formed in the enclosure, the inlet port(s) coupled to the internal channels to properly distribute the material.

13 Claims, 7 Drawing Sheets

ROLLER CHAIN LUBRICATOR

CROSS-REFERENCE TO RELATED APPLICATIONS

This application claims the benefit of U.S. Provisional Application 61/360,937, filed Jul. 2, 2010 and U.S. Provisional Application No. 61/412,111 filed Nov. 10, 2010, both of which are herein incorporated by reference.

TECHNICAL FIELD

The present invention relates to an apparatus for lubricating roller chains and, more particularly, to a lubricating enclosure that is inserted over a mounted chain and disperses lubricant to specific locations, utilizing a conventional lubricant (or other solvent, cleaning solution, or the like) that is applied as an input to the enclosure.

BACKGROUND OF THE INVENTION

Various chain-driven machines, such as conveyors, motorcycles, bicycles all-terrain vehicles, gearboxes, power transmission devices and the like, require maintenance of the drive chain (generally taking the form of a "roller chain"). For these chains, regular maintenance includes lubrication after, for example, a certain number of hours of use or in accordance with a lubrication schedule as defined in the operating manual for the machine. Lubricating the drive chain involves cleaning the chain and placing lubricant in the proper areas of the chain links.

In practice, very little "cleaning" is performed, other than a quick wipe, and the lubrication takes the form of spraying a lubricant onto the drive chain until it is saturated (or at least until a sufficient amount of lubricant has been coated on the drive chain). Inasmuch as the spray will coat other surrounding components (which then need to be cleaned or masked for protection prior to beginning the process), lubrication is generally not performed as often as recommended.

In some arrangements, the drive chain is removed from the equipment and the lubricant is sprayed on the chain as it lays on the floor. Such a manual lubrication process is considered to waste a considerable amount of the lubricant, with the attendant overspray not only wasting lubricant but adding to the time involved in cleanup.

Various attempts have been made in the past to improve the lubrication process, as evidenced by the prior art references discussed below. The following listing is not to be considered as exhaustive, but merely indicative of the state of the art.

U.S. Pat. No. 3,896,901 issued to A. J. Ango on Jul. 29, 1975 discloses an "automatic chain lubricator" for a motorcycle (or similar vehicle) where a portion of the emissions from the exhaust pipe is collected and directed to the drive chain such that the residual of oil forming a part of the emissions is continuously applied to the chain during operation of the machine. Unfortunately, various other unwanted particulate matter may also be collected and directed to the drive chain in this apparatus, leading to other mechanical problems with the drive chain.

U.S. Pat. No. 4,783,186 issued to T. Manning et al. on Nov. 8, 1988 discloses an aerosol dispenser and applicator assembly for cleaning and lubricating the sprocket chain of a chain drive. The applicator is formed by a headpiece having a pair of parallel jaws cantilevered above the spray nozzle of the aerosol dispenser. The inside of the applicator is covered with bristles, so that as the aerosol lubricant is released, a mist is formed and trapped within the applicator assembly. The applicator assembly can then be moved back and forth along the chain so that the bristles will clean the chain and disperse the lubricant along and within the surfaces of the chain.

U.S. Pat. No. 5,020,637 issued to J. F. Hoenselaar et al. on Jun. 4, 1991 discloses a different type of lubricating device that is also attached to the spray nozzle of an aerosol lubricant spray can. The Hoenselaar et al. device takes the form of a cylinder and includes brush bristles formed all around the interior. The device includes an open slot for accepting a chain and uses the brush bristles to apply the lubricant along the chain.

U.S. Pat. No. 5,213,180 issued to S. J. Masonek et al. on May 25, 1993 similarly uses an apparatus including bristles to apply the lubricant to a chain, in this case in the form of an elongated plastic housing. The housing is openable with a living hinge so that it may be placed around and closed over a drive chain, with the interior of the housing covered by flexible plastic bristles. A flexible length-adjustable cord releasably secures the device in a stationary position over the chain, with the lubricant dispensed through a hose from a spray can through an attachment fitting and distribution manifold on the top of the assembly and into the interior to be applied to the chain by the plastic bristles.

While these and other arrangements are useful in applying a lubricant to a drive chain, the use of bristles is not considered to be a preferred application arrangement, since the bristles themselves become clogged with old lubricant and debris (and may need to be cleaned themselves during the lubrication process), or may break off, wear or lead to non-uniform application of the lubricant to the chain.

SUMMARY OF THE INVENTION

The needs remaining in the prior art are addressed by the present invention, which relates to an apparatus for lubricating roller chains and, more particularly, to a lubricating apparatus that is inserted over a mounted chain and disperses lubricant to specific locations through channels formed within the apparatus. Indeed, it is to be understood (as discussed in detail below) that the apparatus of the present invention is not limited to dispersing lubricant to a drive chain, but to dispersing any desired material, such as a cleaning solvent, compressed air or other gas, liquid lubricant or cleaning material, steam, or any other material that needs to be applied to a drive chain during a maintenance procedure.

In accordance with the present invention, the channels in the apparatus are strategically located within the enclosure to ensure that the applied material (lubricant, cleaning solvent, or the like) is directed to specific locations along the chain. A conventional material source (for example, a spray can) is used in conjunction with the inventive apparatus and is coupled to an input port on the enclosure that then directs the lubricant (or other applied material) into the channels.

In one embodiment of the present invention, the apparatus comprises a single piece enclosure that is placed directly over the chain, with a properly-shaped indentation formed along its bottom surface for accommodating the chain and guiding the chain as it passes through the apparatus. The enclosure is configured to include a plurality of internal channels that are used to direct an introduced material to strategic positions along the chain. The apparatus of this embodiment further comprises an anchor clip, attached to the enclosure, that extends outward from the enclosure and engages a stationary object (such as a portion of the machinery upon which the chain is mounted, or the canister of the material being applied to the drive chain). The anchor clip is utilized to hold the enclosure in a fixed location while the drive chain is lubricated/cleaned by being pulled through the enclosure.

In one configuration of this embodiment, the apparatus is formed to include two separate inlet ports, each port for receiving a different material. For example, a first inlet port may be used to receive a cleaning material (solvent, compressed air/gas or the like), which then passes through a first plurality of internal channels and is directed onto the drive chain to remove a build-up of grease and other debris from a drive chain. A second inlet port is the used to receive a lubricant, which is then directed by a second plurality of internal channels onto a "clean" section of the drive chain. In general, any suitable number of inlet ports may be included in the apparatus.

In another configuration, the apparatus further comprises a clean-out channel, disposed at/near the termination of the internal channels at the outlet ports, to allow for any build-up of the material being applied to be quickly and easily removed.

In an alternative embodiment, the apparatus comprises a two-piece enclosure that clamps around the drive chain (e.g., a top enclosure positioned over the chain and a bottom enclosure disposed underneath the chain), with a mechanism used to latch the two pieces together. Preferably, the top and bottom enclosures are interlocking to self-latch. This embodiment assists the anchor clip in ensuring that the apparatus remains stationary as the chain passes through, since the bottom portion of the enclosure prevents the chain from drooping or otherwise falling out of place with respect to the apparatus. In similar fashion to the other embodiment, the material(s) being applied is/are introduced through one or more inlet ports (preferably formed in the top enclosure portion) and dispersed through a plurality of internal channels. Advantageously, the inclusion of the bottom enclosure functions as a catch basin to collect any extraneous lubricant/cleaner that drips off of the chain during application. The bottom enclosure may also be configured to include a drain channel to allow for the collected material to be easily removed.

Other and further embodiments and advantages of the present invention will become apparent during the course of the following discussion and with respect to the following drawings.

BRIEF DESCRIPTION OF THE DRAWINGS

Referring now to the drawings, where like numerals represent like parts in several views.

DESCRIPTION OF THE INVENTION

An applicator for lubricants, cleaning solvents or the like (hereinafter defined as "applied material") has been developed that is used to performance maintenance operations a drive chain without requiring the chain to be removed from the machinery to which it is attached (e.g., conveyor, gearbox, motorcycle, bicycle, or the like) or requiring the work area to be extensively prepared to minimize clean-up from overspray, drippings, waste and the like. The applicator takes the form of an enclosure with an indentation along its bottom surface that fits over a section of the exposed chain. The indentation is formed longitudinally along the length of the apparatus such that as the chain is moved, it rides along the indentation. The applicator includes an inlet port (to allow for a spray lubricant, cleaning solvent, or the like to be introduced to the enclosure) and internal channels for distributing the applied material to the proper locations along a chain. The applicator of the present invention prevents overspray, while the position of the channels within the enclosure controls the application of the material to the proper locations on the chain.

Figure 1:
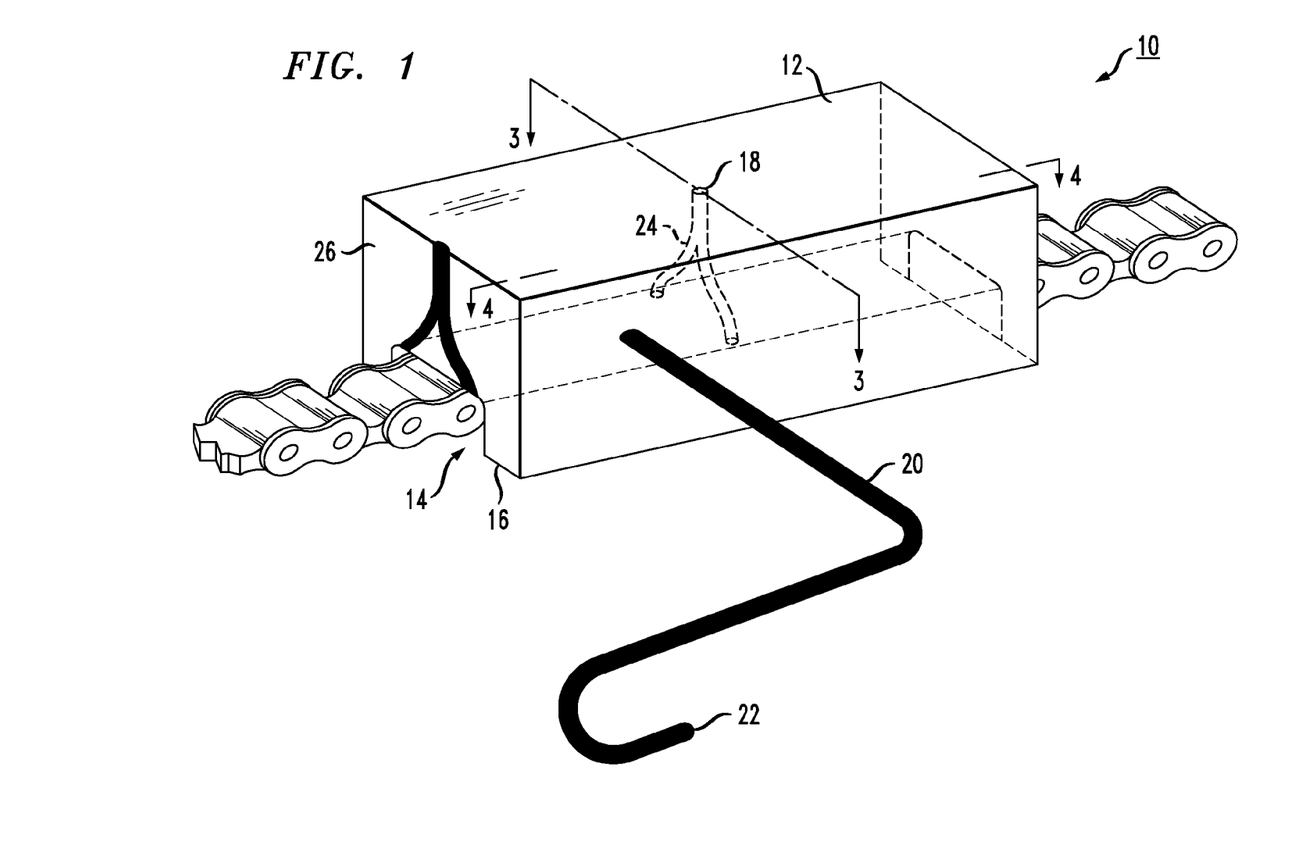
FIG. 1 is an isometric view of an exemplary apparatus for applying lubricants, cleaning solvents and the like to a drive chain, formed in accordance with the present invention.

FIG. 1 is an isometric view of an exemplary applicator 10 formed in accordance with the present invention, in this view illustrated in place over a portion of a drive chain. As shown, applicator 10 comprises a rectangular enclosure 12 (the rectangular shape being exemplary only), with an indentation 14 formed longitudinally along a bottom surface 16 such that when positioned over a drive chain, the chain will ride along indentation 14. Enclosure 12 further comprises an inlet port 18 for introducing a conventional material (spray lubricant, cleaning solvent, compressed air, etc) to applicator 10 and also includes, in this embodiment, an anchor clip 20 for supporting applicator 10 in place over the drive chain. Anchor clip 20 extends outward from enclosure 12, with a terminating portion 22 of anchor slip 20 positioned around a stationary object (not shown) such as, for example, a part of the associated machinery or the canister source of the material being applied. Anchor clip 20 is intended to hold applicator 10 in place at a desired location and prevent applicator 10 from "riding along" the drive chain as the chain is moved. For example, when used with a motorcycle the use of anchor clip 20 allows for the rear tire to be rotated and the drive chain to be advanced a section at a time to "enter" applicator 10, allowing for the entire chain to be lubricated/cleaned in a fairly straightforward manner.

As opposed to the prior art use of bristles to disperse a lubricant around all areas of a drive chain, applicator 10 of the present invention includes a plurality of internal channels 24 that are formed within enclosure 12 and extend from inlet port 18, terminating at desired locations along indentation 14. A pair of channels 24 are shown in phantom in the diagram of FIG. 1. In accordance with the present invention, the plurality of internal channels 24 are strategically disposed along indentation 14 to direct the application of the material to the proper areas of the chain. The embodiment of applicator 10 as shown in FIG. 1 includes a marking of the location of internal channels 24 on endface 26 thereof.

Figure 2:
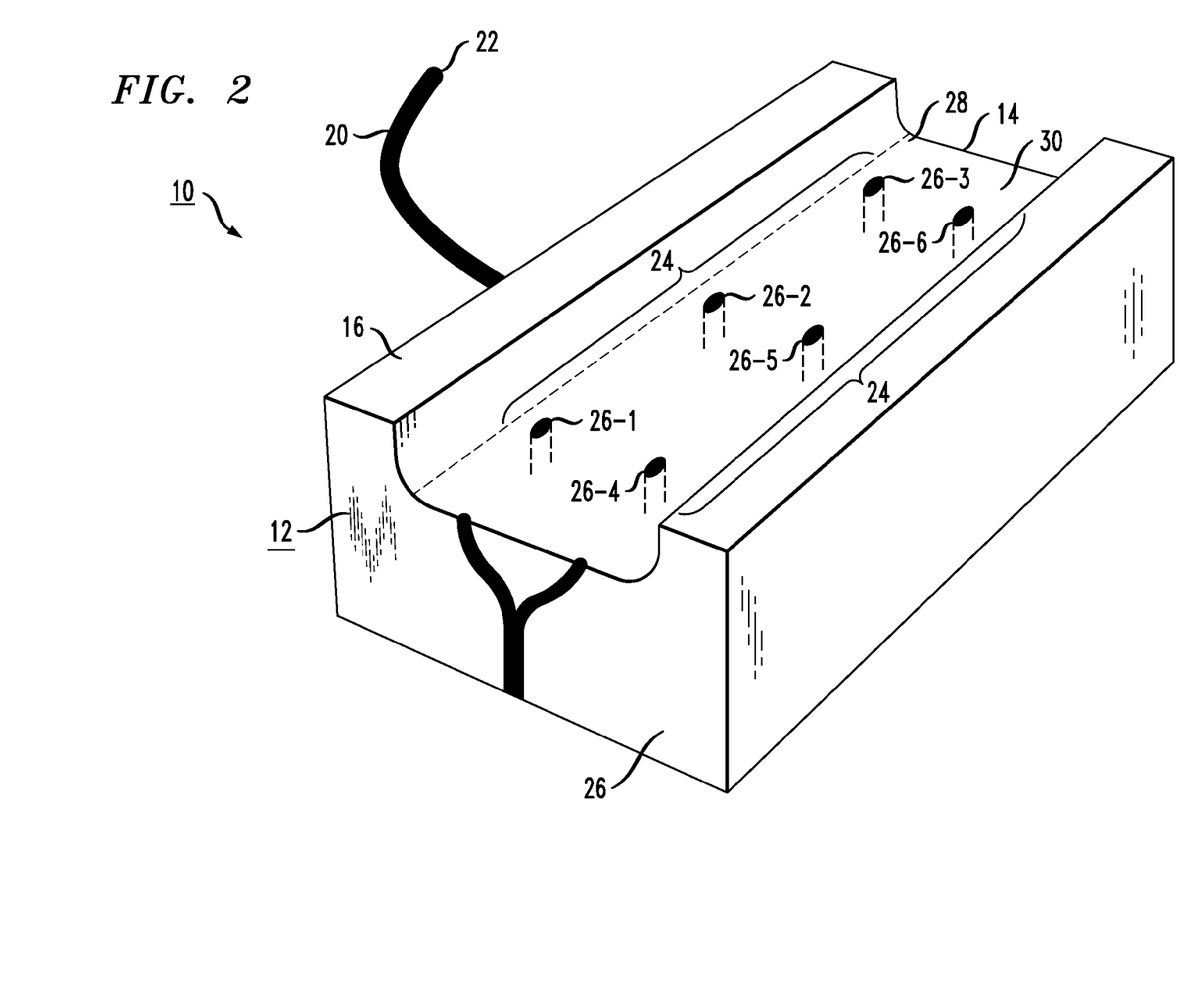
FIG. 2 is an isometric view of the underside of the apparatus of FIG. 1.

FIG. 2 is an isometric view of the underside of applicator 10 of FIG. 1, illustrating the disposition of a plurality of internal channels 24 along indentation 14. In this particular embodiment, a plurality of six different channels 24 are utilized, with a first set of three channels 24 terminating at outlet ports 26-1, 26-2 and 26-3 along an upper edge 28 of indentation 14. A second set of three channels 24 are shown as terminating at outlet ports 26-4, 26-5 and 26-6 along a lower edge 30 of indentation 14. It is to be understood that this particular arrangement is exemplary only; enclosure 12 may be formed to include any desired arrangement of internal channels 24 that will direct the applied material (lubricant, cleaning solvent, etc.) to desired locations along a chain passing along indentation 14. Moreover, the dimensions of channels 24 and ports 26 are similarly discretionary, and need only be sufficient to allow for the free flow of the applied material.

Figure 3:
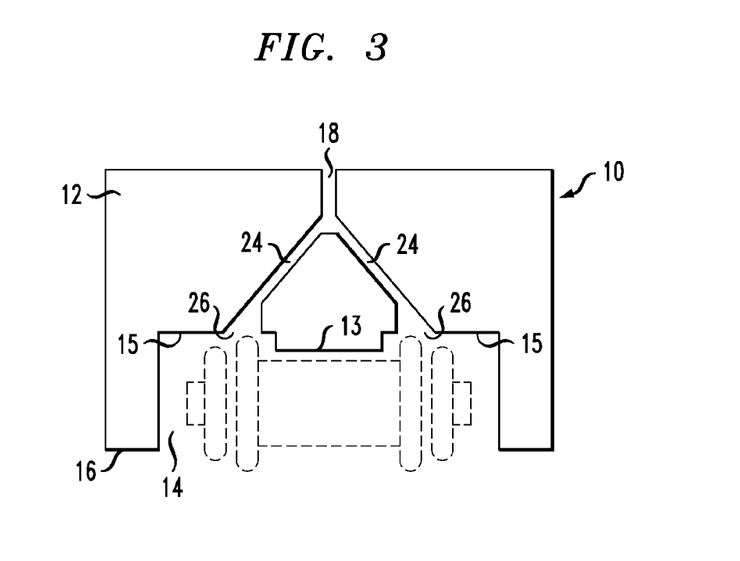
FIG. 3 is a cut-away end view of the apparatus of FIG. 1.

FIG. 3 is a cut-away end view of applicator 10, taken along line 3-3 of FIG. 1. Evident in this view is the position of internal channels 24 and outlet ports 26 relative to a chain passing along indentation 14. Inlet port 18 is also shown in this view. As shown, it is possible to particularly configure indentation 14 to properly guide a specific drive chain, since different types of machinery will use drive chains of different configurations. Referring to FIG. 3, indentation 14 is shown in this embodiment to include a central notch 13 for riding above the cylinder portion of a drive chain, with raised portions 15 allowing for the guiding of the side plates of the drive chain. Other configurations of indentation 14 are possible (including a simple slot) and all configurations are considered to fall within the scope of the present invention.

Figure 4:
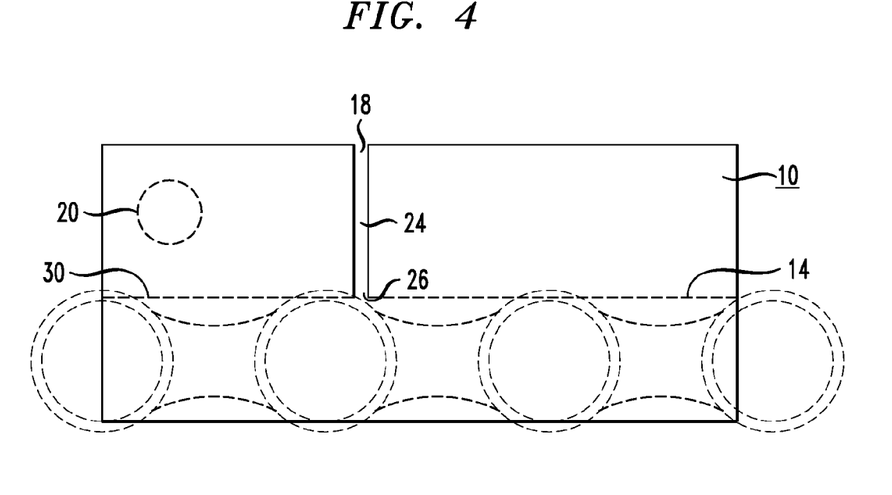
FIG. 4 is a cut-away side view of the apparatus of FIG. 1.

FIG. 4 is a cut-away side view of applicator 10, taken along line 4-4 of FIG. 1. The extent of an exemplary internal channel 24 from inlet port 18 to an outlet port 26 is shown in this view, as well as an exemplary attachment location for anchor clip 20. The longitudinal direction of indentation 14 is shown in phantom in this view.

Figure 5:
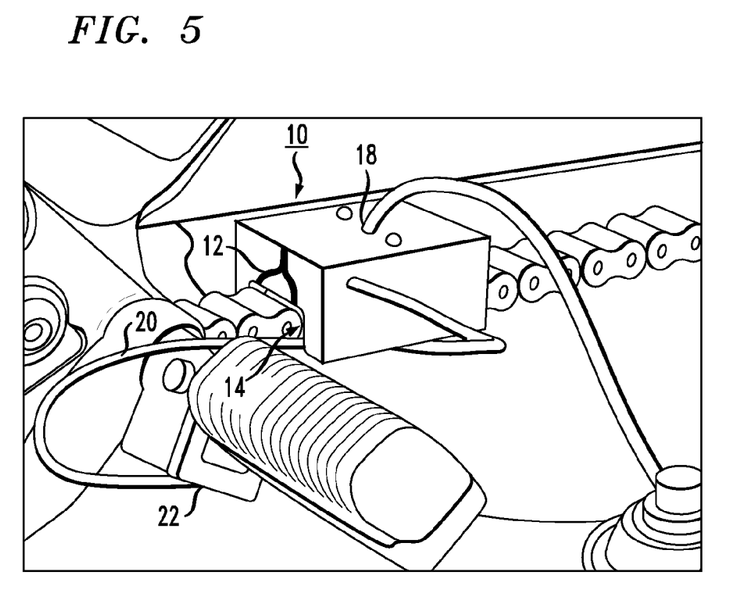
FIG. 5 is a view of the apparatus of FIG. 1 as in place on a motorcycle drive chain.

It is an advantage of the present invention that applicator 10 is simply placed over a drive chain while in place on the associated machinery and utilizes a commercially available lubricant/cleaner that is coupled to inlet port 18. The applicator itself is preferably formed of a polymer material to avoid metal-on-metal contact with the roller chain (although in certain situations, materials such as a metal (e.g., brass or aluminum) or wood may be used) and internal channels 24 are preferably formed to have a smooth exterior surface to allow for easy clean-up. Anchor clip 20 may be formed of any suitable, relatively stiff material that will hold applicator 10 in place. Preferably, a flexible material is used so that clip may be adjusted to fit in place over various types of vehicles. FIG. 5 illustrates applicator 10 in position over a motorcycle drive chain, with anchor clip 20 fit over a motorcycle footpeg to hold applicator 10 in place. In other arrangements, anchor clip 20 may simply be wrapped around the canister of the source material.

Figure 6:
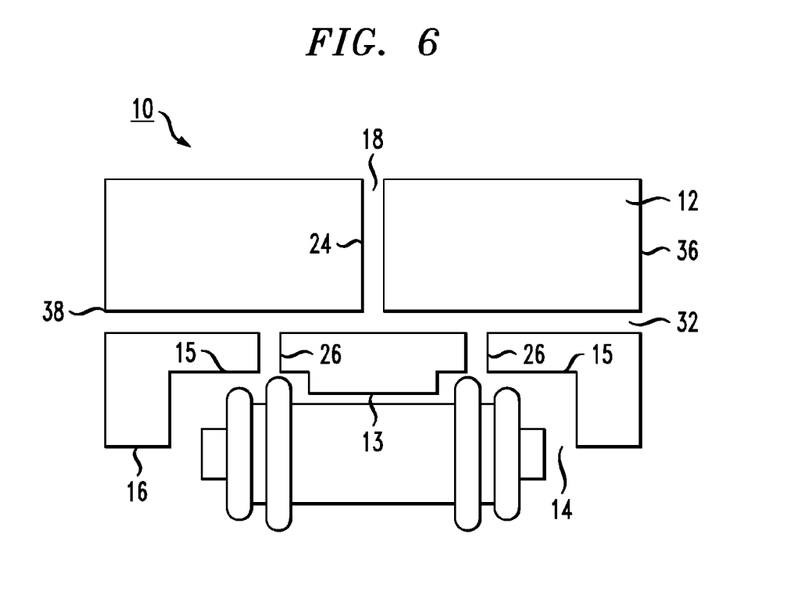
FIG. 6 is a cut-away end view of an alternative arrangement of the embodiment of FIG. 1, including a clean-out channel in the enclosure of the apparatus.

FIG. 6 is a cut-away end view of an alternative configuration of this embodiment of the present invention, showing the inclusion of a horizontal clean-out channel 32 within enclosure 12. Clean-out channel 32 is shown as disposed immediately above outlet ports 26, where the movement of cleaning fluids through channel 32 will prevent the build-up of deposits that would otherwise impede the application of materials (such as a lubricant, cleaning solvent or the like) to a chain. Cleaning fluids (or a cleaning rod) are introduced at a clean-out port 34 formed along sidewall 36 of enclosure 12, flushing out any debris and allowing the debris to exit enclosure 12 through an outlet port 38.

Figure 7:
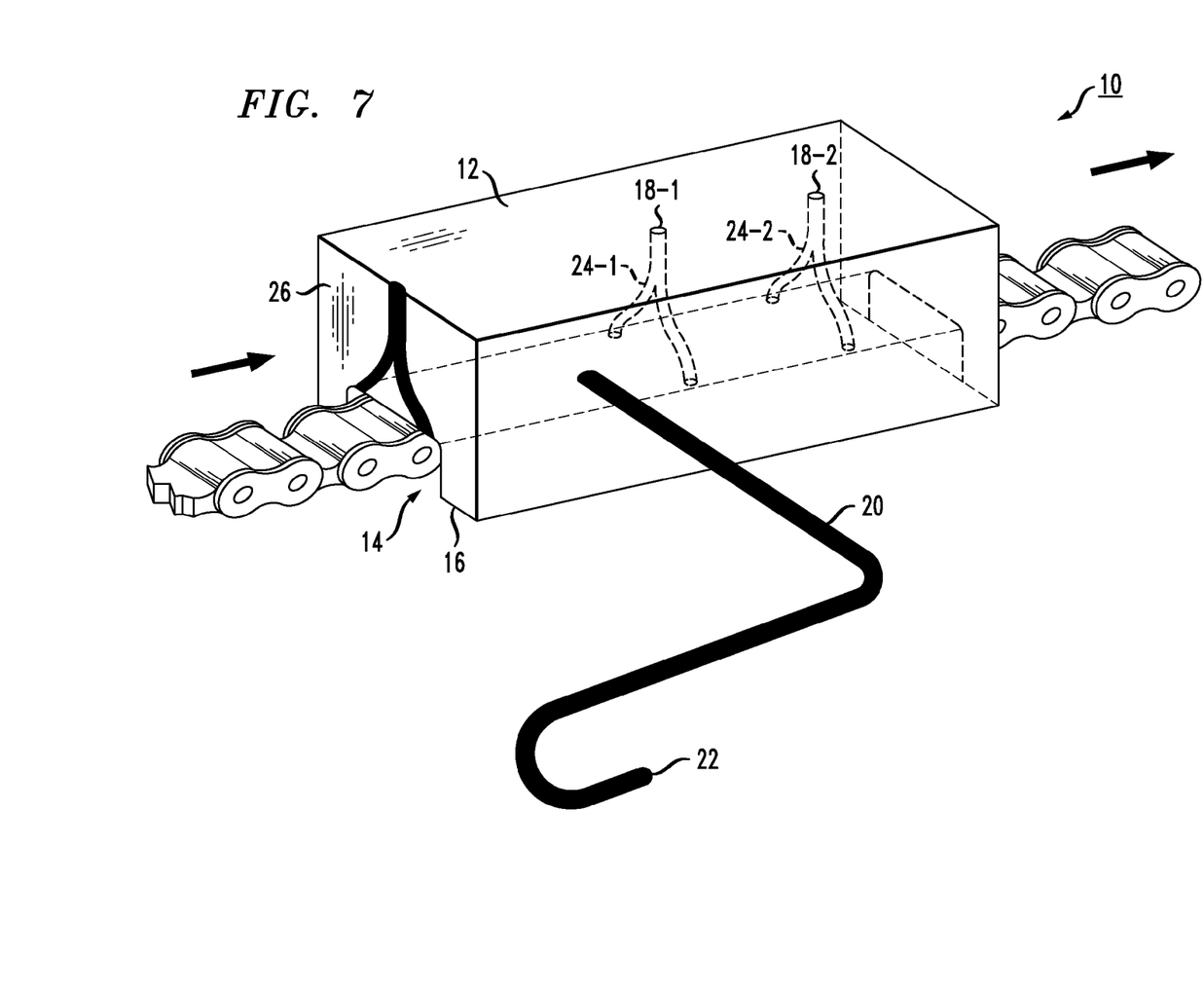
FIG. 7 is an isometric view of a different configuration of the embodiment of FIG. 1, including a pair of inlet ports for (perhaps) introducing different materials onto the drive chain.

While a single inlet port 18 is shown in FIG. 1 (and is considered to be a preferred embodiment), it is to be understood that in a more general form a plurality of separate inlet ports may be used. FIG. 7 illustrates an alternative configuration of the embodiment of FIG. 1, in this case including a pair of inlet ports 18-1 and 18-2 (with associated internal channels 24-1 and 24-2, respectively). In the arrangement of FIG. 7, a cleaning solvent (for example) may be introduced through inlet port 18-1 and used to remove build-up of grease and other debris from a section of drive chain, with a lubricant then introduced through inlet port 18-2 and be applied to a "cleaned" section of drive chain as the chain moves through applicator 10 in the direction of the arrows shown in FIG. 7.

Figure 8:
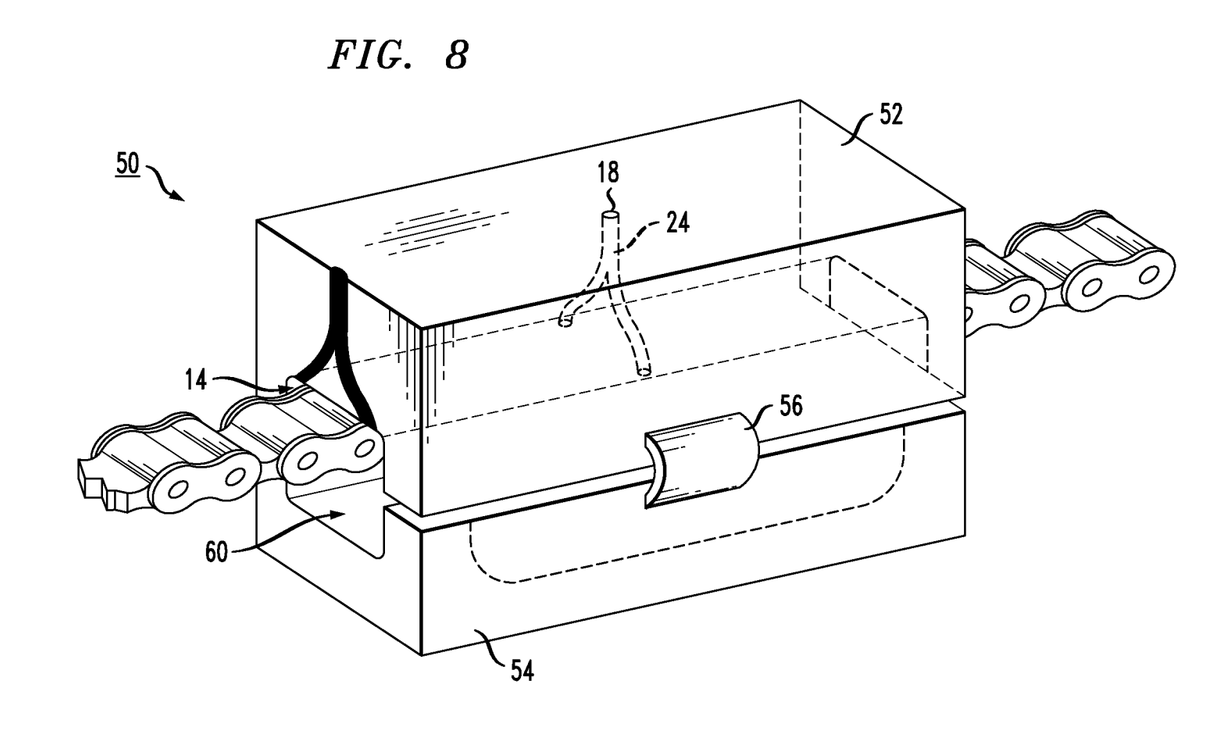
FIG. 8 is an isometric view of an alternative embodiment of the present invention, utilizing an apparatus for applying materials to a drive chain in the form of a two-piece enclosure.
Figure 9:
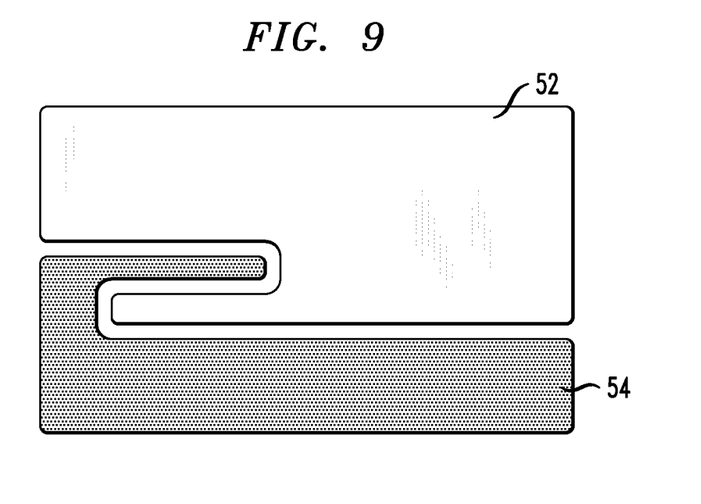
FIG. 9 is a simplified side view of the embodiment of FIG. 8, showing an interlocking configuration for the top and bottom enclosure portions.

FIG. 8 is an isometric view of an alternative applicator 50 formed in accordance with the present invention to further reduce the amount of clean up that may be required. As shown, applicator 50 utilizes a two-piece enclosure, shown as a top enclosure portion 52 and a bottom enclosure portion 54, with bottom enclosure portion 54 formed to include a "catch basin" reservoir 60 to collect any lubricant, solvent, etc that drips off of a chain during the maintenance procedure. In the view of FIG. 8, a simple latching mechanism 56 is used to attach top enclosure portion 52 to lower enclosure portion 54. Alternatively, portions 52 and 54 may be formed to interlock upon attachment without the need for any separate component. FIG. 9 is a side view of an exemplary embodiment where portions 52 and 54 easily and quickly interlock.

Similar to applicator 10 discussed above, applicator 50 of FIG. 8 includes at least one inlet port 18 for receiving a material to be applied to the chain during a maintenance procedure, with internal channels 24 for directing the material to desired locations along an enclosed chain that rides through an opening formed by indentation 14. In this embodiment, any material that does not adhere to the chain will fall into catch basin 60, where catch basin 60 is shown as disposed below indentation 14 and forms part of the opening through which the drive chain will pass.

Figure 10:
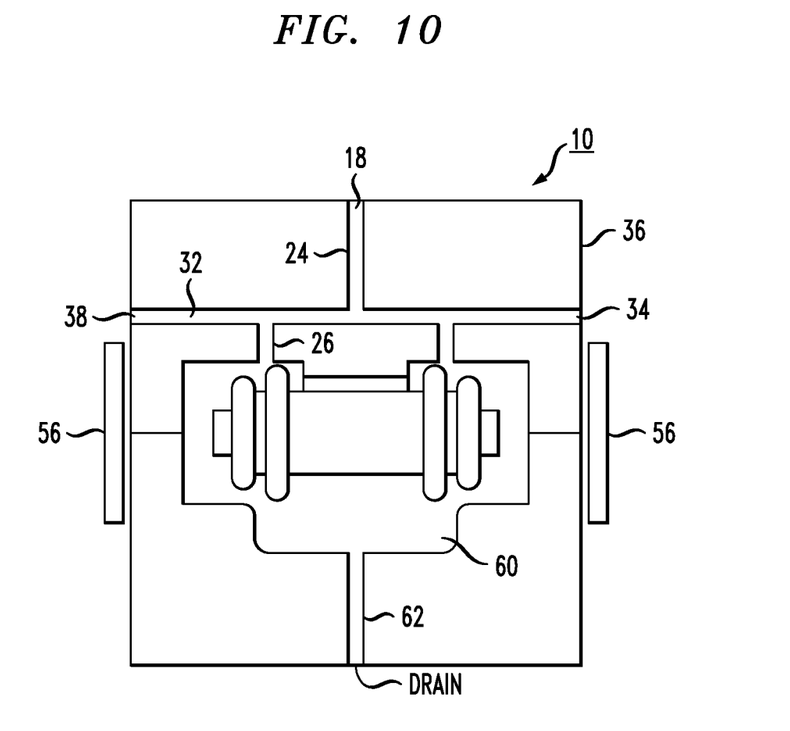
FIG. 10 is a cut-away end view of the embodiment of FIG. 8, illustrating the inclusion of a catch basin the bottom enclosure portion.

FIG. 10 is a cross-sectional view of applicator 50, illustrating the formation of a catch basin 60 in bottom enclosure portion 54 for holding any extraneous material that could drip off of a chain during a maintenance procedure. It is clear from this view that catch basin 60 is disposed beneath indentation 14 and assists in "capturing" the drive chain as it passes through the enclosure and preventing the chain from drooping below applicator 10. Preferably, bottom enclosure portion 54 further comprises a drain channel 62 for removing the collected material from applicator 50.

Although the present invention has been described with a certain degree of particularity, it is to be understood that the present disclosure has been made by way of example and that changes in details to the structure may be made without departing from the spirit thereof. Indeed, the scope of the present invention is intended to be limited only by the claims appended hereto.

What is claimed is:

1. An apparatus for applying material to a drive chain, the apparatus comprising:
   an enclosure to be disposed over the drive chain, the enclosure comprising
   a longitudinal indentation formed along a bottom surface of the enclosure for accommodating the drive chain as it moves therealong;
   a single inlet port for receiving a material to be applied to the drive chain during maintenance,
   a plurality of outlet ports formed along the longitudinal indentation;
   a plurality of channels formed between the single inlet port and the plurality of outlet ports, the plurality of channels branching outward from the single inlet port for carrying the material from the inlet port to the plurality of outlet ports disposed at predetermined locations along the longitudinal indentation so as to apply the material to desired locations of the drive chain moving therealong; and an anchor clip attached to a sidewall location of the enclosure removed from the single inlet port, the anchor clip configured for both extending outward from the enclosure and terminating in an end portion positioned around a stationary object so as to hold the enclosure in a stationary position as the drive chain is moved therethrough or for attachment to a source of the material being applied to the drive chain for holding the enclosure in place as the drive chain is mover therethrough.

2. An apparatus as defined in claim 1 wherein the anchor clip is formed of a flexible material to allow for removable and adjustable attachment to the stationary object or source of material being applied to the drive chain.

3. An apparatus as defined in claim 1 wherein the apparatus further comprises at least one clean-out channel in contact with the plurality of channels for removing debris from the apparatus.

4. An apparatus as defined in claim 3 wherein the clean-out channel is disposed in a horizontal orientation with respect to the bottom surface of the enclosure.

5. An apparatus as defined in claim 3 wherein the clean-out channel is disposed immediately above and in contact with the plurality of outlet ports.

6. An apparatus as defined in claim 1 wherein the enclosure comprises a pair of inlet ports, each inlet port having an associated plurality of internal channels, each inlet receptive to a different material to be applied to the drive chain.

7. An apparatus as defined in claim 1 wherein the apparatus further comprises
a lower enclosure disposed below the apparatus enclosure and attached thereto so as to surround the drive chain passing therethrough, the lower enclosure including a catch basin for collecting material dripping off the drive chain.

8. An apparatus as defined in claim 7 wherein the lower enclosure further comprises a drain channel coupled to the catch basin for eliminating the material collected in the catch basin.

9. An apparatus as defined in claim 7 wherein the apparatus further comprises a latch mechanism for attaching the lower enclosure to the apparatus enclosure.

10. An apparatus as defined in claim 7 wherein the apparatus enclosure and lower enclosure are formed to interlock upon attachment.

11. An apparatus as defined in claim 1 wherein the enclosure comprises a polymer material.

12. An apparatus as defined in claim 1 wherein the enclosure is formed of metal.

13. An apparatus as defined in claim 1 wherein the enclosure is formed of wood.

\* \* \* \* \*